United States Patent [19]

Zlobinsky et al.

[11] Patent Number: 4,997,006
[45] Date of Patent: Mar. 5, 1991

[54] ROTARY VALVE FOR VACUUM SERVICE USE

[75] Inventors: Yury Zlobinsky, Massapequa; Felicia Celaru, Brooklyn, both of N.Y.

[73] Assignee: Savant Instruments, Inc., Farmingdale, N.Y.

[21] Appl. No.: 514,115

[22] Filed: Apr. 25, 1990

[51] Int. Cl.⁵ .................................. F16K 11/074
[52] U.S. Cl. .................. 137/625.21; 251/304; 251/317; 251/192
[58] Field of Search .................. 137/625.21; 251/304, 251/180, 317, 175, 192

[56] References Cited

U.S. PATENT DOCUMENTS

| | | | |
|---|---|---|---|
| 1,604,488 | 10/1926 | Seck | 251/304 |
| 2,567,428 | 9/1951 | Greeley | 251/180 X |
| 3,082,791 | 3/1963 | Miller | 251/180 X |
| 3,203,249 | 8/1965 | Jentzsch | 251/180 X |
| 3,237,644 | 3/1966 | Beck | 251/180 X |
| 3,297,052 | 1/1967 | Robinson | 137/625.21 |
| 3,796,232 | 3/1974 | Dalton | 137/625.21 |
| 3,851,669 | 12/1974 | Zellbeck | 137/625.21 |
| 3,913,834 | 10/1975 | Supper | 137/625.21 X |

*Primary Examiner*—Alan Cohan
*Attorney, Agent, or Firm*—Morrison Law Firm

[57] ABSTRACT

A simply constructed, inexpensively manufactured rotary valve includes a molded plastic valve body having a seat on which is received a molded plastic rotary valve cover, the underface of the valve cover having an elongate flow groove therein, that groove being encircled by another groove in which a seal is disposed. The ends of the valve cover flow groove can be registered with a circularly spaced pair of openings in the valve body seat to establish communication through the valve between an evacuation space and a vacuum producing means, these seat openings in turn leading to valve body passages that are in communication with respective ones of a pair of integrally formed nipples on the body. The nipples which extend laterally from the valve body, serve as receptive mounting locations for tubes connected to the evacuation space and vacuum producing means. Telltale means are provided on the valve cover to facilitate orienting same when connection between the evacuation space and vacuum producing means is to be made. A vent passage in the valve cover can be registered with one and/or the other of the seat openings when it is desired to bleed air into the evacuation space and/or vacuum producing means from ambient atmosphere.

16 Claims, 3 Drawing Sheets

ROTARY VALVE FOR VACUUM SERVICE USE

BACKGROUND OF THE INVENTION

The present invention relates to rotary valve and, refers more particularly, to a rotary valve for vacuum service use.

Prior rotary valves of which we are aware, are in the main used for pressure service. These valves of which U.S. Pat. Nos. 3,297,052; 3,796,232 and 3,851,669, inter alia, are representative, generally are constructed of many parts arranged in somewhat complex construction including tight mechanical sealing connections being made between the several parts in effort to insure non-leakage character in the valve during use. Also, these prior pressure service rotary valves are almost always made of machined parts which fact increases valve costs substantially, the constructions of these valves not readily being adapted for, e.g., manufacture by plastics molding techniques. Further, pressure line connection to the valve is usually made with threaded connections and these connections sometimes represent a problem initially of poor manufacture with attendant leakage or in time with use can become a leakage source. Further such constructions do not provide simplified, inexpensive valves for vacuum use service, particularly in the respect that the service use itself be employed as an adjunct in effecting sealing of the valve. Glass valves have been used for vacuum service, particularly in laboratory situations, but these types are somewhat costly and in time with continued use, present system leakage problems.

OBJECTS AND SUMMARY OF THE INVENTION

Accordingly, it is an object of the invention to provide a rotary valve for vacuum service use which overcomes the drawbacks of the prior art.

It is a further object of the invention to provide a rotary valve for vacuum service use which is constructed such as to employ atmospheric pressure as a load imposing agency in sustaining a tight seal of a valve seal element to preclude air incursion into the vacuum circuit in which the valve is used.

It is a still further object of the invention to provide a rotary valve for vacuum service use which is of simplified construction involving use of only two major parts, viz., a valve body and a valve cover, yet the valve providing sure and longtime service for its intended use purpose.

Another object is to provide a rotary valve for vacuum service use in which the two major parts thereof are of molded plastic material construction which allows considerable advantages over prior machined valve structures, integration of hose connector nipples in the valve body structure being illustrative of such advantages.

Briefly stated, there is provided a simply constructed, inexpensively manufactured rotary valve which includes a valve body having a seat on which is received a rotary valve cover, the underface of the valve cover having an elongate flow groove therein, that groove being encircled by another groove in which a seal is disposed. The ends of the valve cover flow groove can be registered with a circularly spaced pair of openings in the valve body seat to establish communication through the valve between an evacuation space and a vacuum producing means, these seat openings in turn leading to valve body passages that are in communication with respective ones of a pair of nipples integrally formed on the body. The nipples serve as receptive mounting locations for tubes connected to the evacuation space and vacuum producing means. Telltale means are provided on the valve cover to facilitate orienting same when connection between the evacuation space and vacuum producing means is to be made. A vent passage in the valve cover can be registered with one and/or the other of the seat openings when it is desired to bleed air into the evacuation space and/or vacuum producing means from the ambient atmosphere.

In accordance with these and other objects of the invention, there is provided a simply constructed, inexpensively manufactured rotary valve for interconnecting a space to be evacuated and a vacuum producing means, the valve comprising a valve body having a recessed circular outline flat seat and first and second passages therein, the respective passages each having a first passage end termination at one of a circularly spaced pair of seat face openings, an opposite passage end of each respective passage terminating in communicative juncture with one of a pair of tubular nipples extending laterally from the valve body at opposed locations thereon, one nipple being adapted for receiving a tube communicating with said space, the other nipple being adapted for receiving a tube communicating with the vacuum producing means. A rotary valve cover having a circular outline flat face is receivable on said valve body with said flat face juxtaposed concentrically with said seat, said valve cover having an elongated curved, blind groove formed in its flat face, said groove having opposite end terminations at circularly spaced locations in said cover flat face. An endless elastic seal member also is provided, and the flat face of the cover has a further groove formed therein encircling said blind groove in a course following that of said blind groove, with the seal member being received in said further groove and extending downwardly a distance from the cover flat face. Means are provided for captively rotatably securing the valve cover to the valve body but with limited freedom of the cover to move axially toward and away from the seat, rotatably orienting the cover on the valve body to register ends of the blind groove with respective ones of the seat openings establishing communication between said space and said vacuum producing means, reduced pressure within said valve when said cover is so oriented and said vacuum producing means is operated resulting in ambient atmospheric pressure imposing a loading on said cover and urging its flat face toward said seat whereby said seal is caused to be deformed against said seat to seal the flow course run in the valve against ambient pressure incursion thereto.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 4 is a top plan view of the valve body, depicting the seat and the openings therein that mark one termination point of the internal valve body passages which merge with the nipple passages;

FIG. 5 is a vertical central sectional view of the valve body;

FIG. 6 is a vertical central sectional view of the valve cover showing the elongated flow groove and seal groove formed therein, this valve cover form not having as deepened center opening as the FIG. 2 form;

FIG. 7 is a plan view of the underside of flat face part of the valve cover showing the elongated flow groove formed therein and the seal groove which encircles that flow groove;

DETAILED DESCRIPTION OF THE PREFERRED EMBODIMENT

Figure 1:
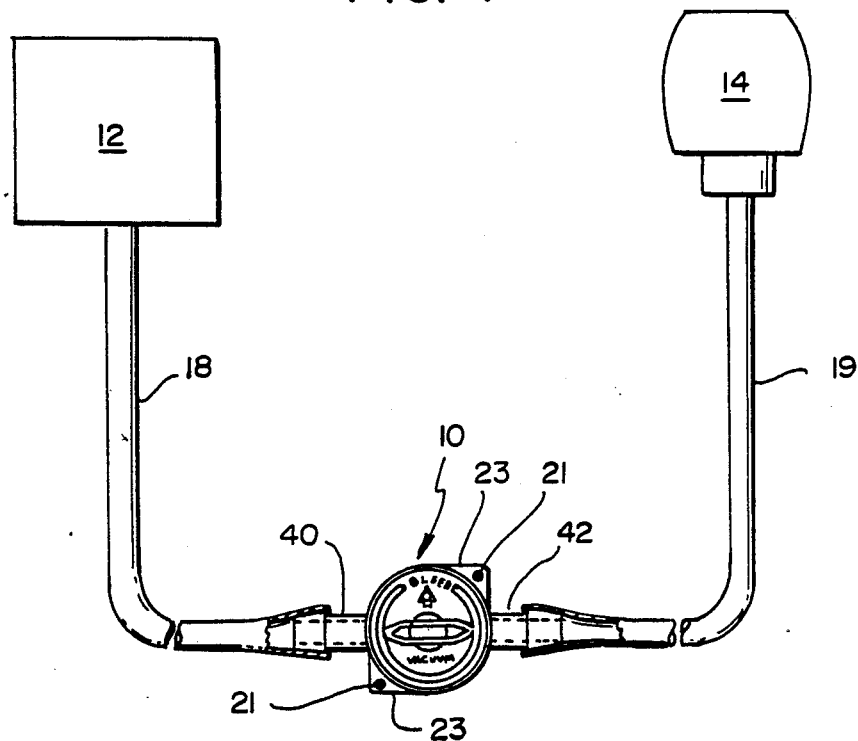
FIG. 1 is a top plan view on reduced scale of a rotary valve constructed in accordance with the principles of the invention, there being shown the tubes connected to the valve body nipples by means of which the rotary valve is connected to the evacuation space and the vacuum producing means.

With reference to FIG. 1, it will be seen that the valve 10 of the present invention is intended for use in a vacuum environment, i.e., it is used to establish or block communication between an evacuation space 12, such as a specimen drying chamber and a vacuum producing means 14, such as a pump. Commonly, the valve will be located on or adjacent a laboratory workbench, where for example, a technician readily can operate same, the evacuation spaces and vacuum producing means usually being at remote locations and connected with the valve by means of respective tubular hoses 18,19. The valve can have flanged extensions 23 for affixing it to a workbench with screws 21 etc.

As will be understood from the hereinafter given description, the valve 10 embodies simplicity of construction, economy of manufacture and high reliability for intended use purpose in its structure. To those ends, the valve is made from molded plastic material such as polypropylene thereby eliminating costly machining procedures in manufacturing and enabling integration in and as part of a common valve structure, of components heretofore in machined valves required to be separate and connectable members, e.g., threaded hose fittings. Further, the valve needs no maintenance to assure proper seal to preclude entry of ambient atmosphere to the vacuum system since the valve construction takes advantage of atmospheric air pressure as an aid in sustaining tight seal relationship in the valve during vacuum service use. Sealing is achieved with an elastic seal member held in a groove with a novel seal holding means.

Figure 2:
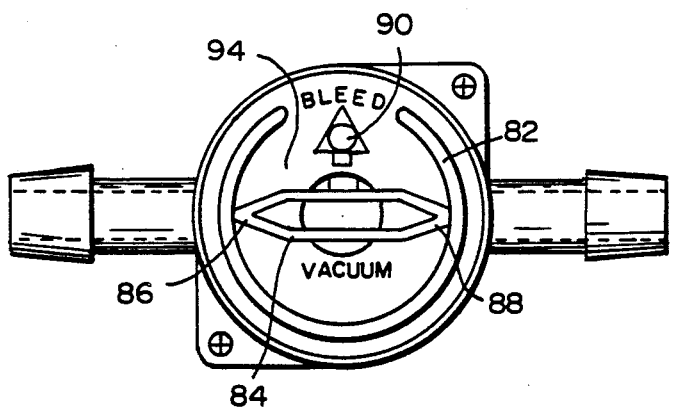
FIG. 2 is a top plan view of the valve on larger scale than shown in FIG. 1.
Figure 3:
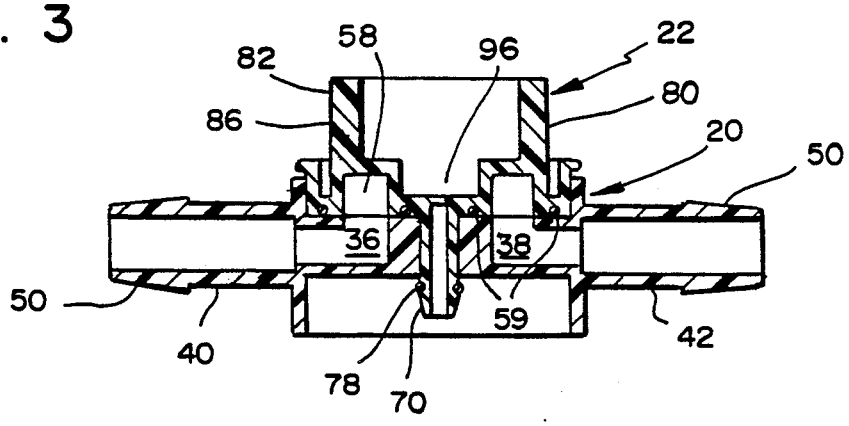
FIG. 3 is a vertical central sectional view of the rotary valve.
Figure 2:
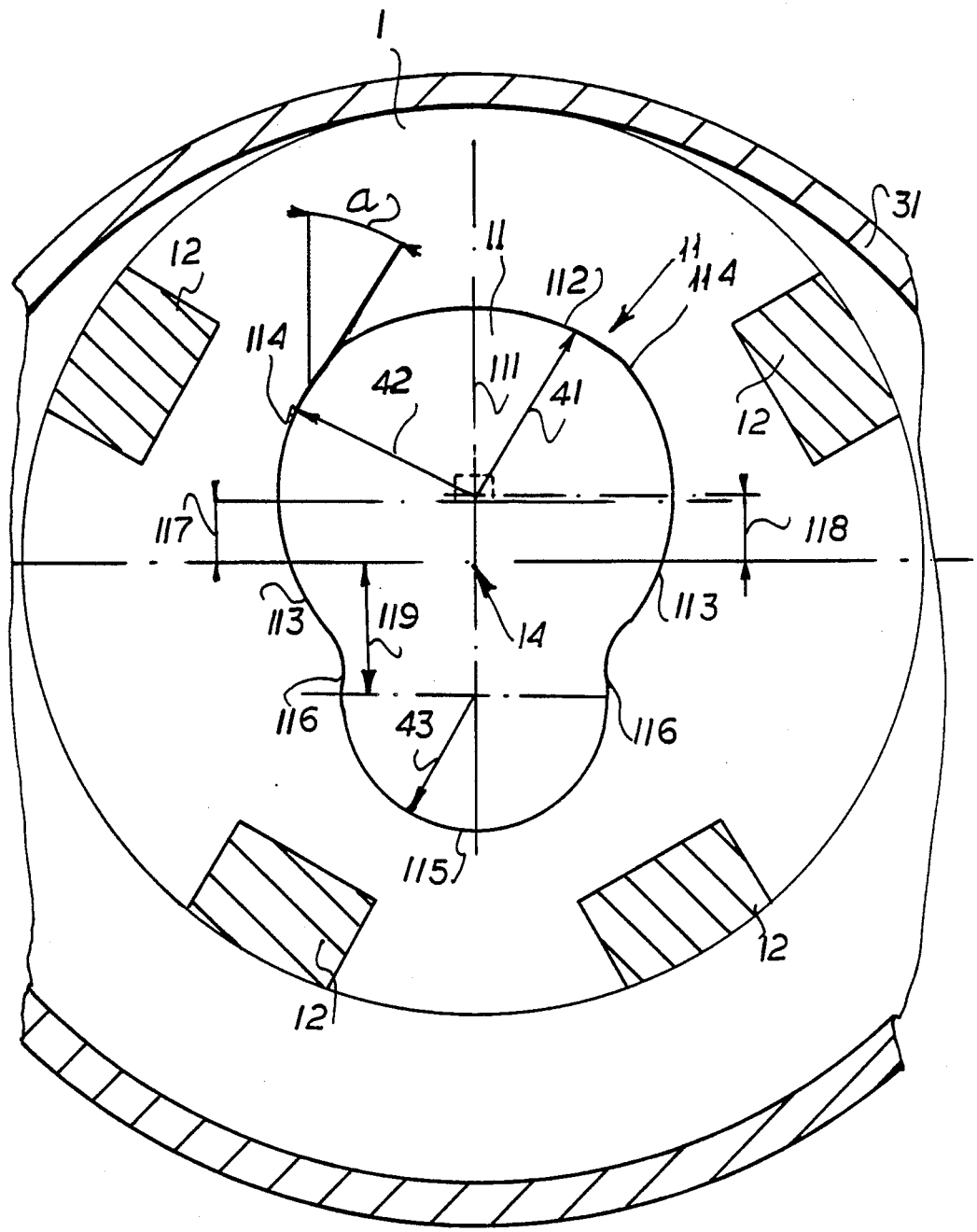

Referring now to FIGS. 2–4, the valve 10 has a body 20 and a valve cover 22 received on the body, both these parts being molded polypropylene members, the body having a recessed, flat circular outline seat surface 24 on which the valve cover is received, the valve cover having a lower, circular outline, flat surface 26 which in valve assembled condition sits concentrically juxtaposed to seat 24, being spaced therefrom by presence of a seal member extending axially downwardly from flat surface 26 in manner and for purpose as will be amplified later on. The seat 24 has a pair of openings 30,32 therein, these openings being at circularly spaced, e.g., at diametrically opposed locations as best seen in FIG. 4, although they could be spaced at 90 degrees, 135 degrees etc with equal facility. The openings constitute each, a one end termination of one of the pair of internal passages 36,38 formed in the valve body and which passages merge communicatively into the passages of respective nipples 40,42 extending laterally outwardly from the valve body at, e.g., diametrically opposite locations on the body exterior surface. As with the circular spacing of the openings 32,34, the nipples can be spaced on the body at any number of angular relationships. The nipples 40,42 are the receptor surfaces for one end of the hoses 18,19, the tip end sections of the nipples being enlarged as at 50 to facilitate airtight jointing of the flexible material hoses thereon. Since the nipples are molded as an integral part of the valve body, there is no problem of leakage to be present as in the case commonly, where a machined valve body is drilled and threaded for reception of a threaded fitting on which ultimately a hose is to be received.

The valve body 20 also has a central, axially directed through bore 52 which serves as will be discussed below, for securing the valve cover to the valve body. Upstanding annular body skirt 54 encircles the seat as readily can be seen from reference to FIGS. 4 and 5.

The valve cover 22 or movable part of the valve has as seen from FIGS. 6 and 7, a lower flat surface 26 of circular outline, such surface being characterized by presence therein of an elongated blind flow groove 58, this groove having in the depicted form, an extent of a little more than a 180 degree sweep about the geometric center of flat surface 26, that sweep being such that the groove opposite end terminations are disposed at diametrically opposed locations to enable positioning of the flow groove ends in register with seat opening 30,32. The groove length of course will vary in correspondence to the circular spacing between the openings 30,32. A seal groove 60 also is formed in the valve cover flat face surface and it encircles the flow groove 58 following a course identical to that of the flow groove. The seal groove serves to receive an endless elastic seal member 59 which seal member extends downwardly a distance from the flat surface of the valve cover to engagement with the seat surface in sealing contact therewith and as described later.

Figure 8:
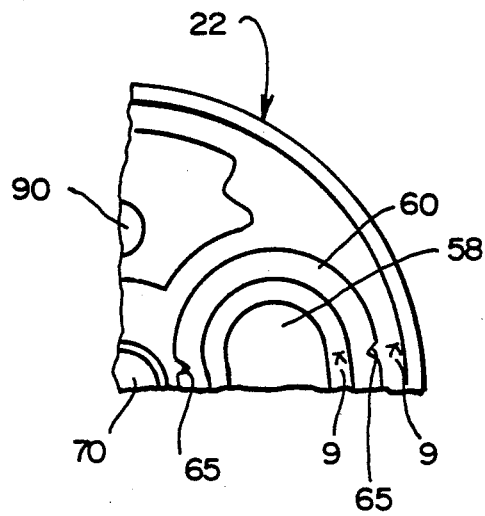
FIG. 8 is an enlarged fragmentary plan view of the face part shown in FIG. 7 an illustrates one of the projections formed in the valve cover structure to project into the seal groove to serve as a holding means to hold the elastic seal in the seal groove.
Figure 9:
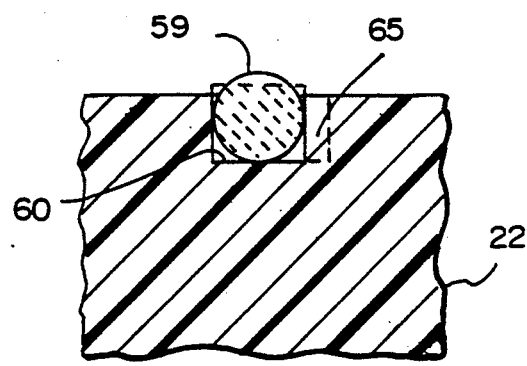
FIG. 9 is a fragmentary sectional view on enlarged scale taken on the line 9—9 in FIG. 8 and shows how the seal groove projections engage the elastic seal to hold same, the seal being depicted in outline in the shape it has when no condition of vacuum exists in the valve.

The cover member embodies seal holding means for securely holding the seal member 59 (in one form constituted by an O-ring) in groove 60, such means being a number of projections 65 extending laterally into the groove 60 as best seen with reference to FIGS. 7-9. These projections 65 restrict the lateral span of the groove at their locations to a measure that is smaller than the cross-sectional dimension of the seal member as seen in the full line showing of FIG. 9, so that the seal is pinched at these locations to create a holding force preventing the seal from dropping out of the groove 60.

The FIG. 9 full line showing of the seal reflects seal condition at non-vacuum connection condition. When the valve is oriented to establish communication between the evacuation space and vacuum producing means, the lower pressure within the valve provides that ambient air pressure acts on the seal to compress it from the full line position (at right side part of seal member in FIG. 9) laterally leftwardly to the position shown in that Figure in long and short dashed lines. In other words, the seal will be deformed leftwardly by air pressure and a space will exist between the seal member and the outer vertical wall of groove 60. This compression leftwardly of the seal member also results in axial movement of the seal member against the seat 24 to enhance the degree of air-excluding seal condition provided in the valve.

As seen in FIG. 3, valve cover, 24 includes a pivot 70 extending downwardly centrally of the valve cover structure and received in the bore 52 of the valve body, the pivot providing means by which the valve cover can rotate on the valve body seat and also being an instrumentality with which captive securement of the valve cover to the valve body is achieved. Pivot 70 extends some distance below valve body lower wall 72 and it has an encircling groove 74 formed therein so that this groove can receive a keeper ring 78 such as an O-ring of elastic material, thereby to captively connect or secure the valve cover to the valve body. This captive securement however, allows the valve cover to move axially of the valve body to a limited degree, that is lower surface 26 can be moved toward and away from the seat surface to a predetermined limit of such movement. This is to be seen as a major difference between the valve of the invention and prior rotary valve constructions wherein these valves being constructed for pressure applications (U.S. Pat. No. 3,297,052 being exemplary of such pressure service use valves) have the valve cover secured in fixed, non-rotational relationship to the seat and employ an intermediate rotatable disc and the like for valving function.

This limited movement is possible because of the location placement of pivot groove 74 on the pivot. As can be seen in FIG. 3, and with the valve assembled, the groove and the keeper ring are situate a distance below the underside of the valve body enough to allow the cover to move about 10–30 thousands of an inch axially relative to the valve body and the surface 26 thereof move toward and away from the valve seat 24. Thus when the valve is oriented to establish communication between the evacuation space and the vacuum producing means, a reduced pressure exists in the valve and the ambient atmospheric pressure imposes loading on the valve cover upper surface to press the valve cover down and deform the elastic seal member 59 against the valve seat. In this manner normal ambient environment conditions serve as an aid to valve and vacuum system sealing.

Figure 10:
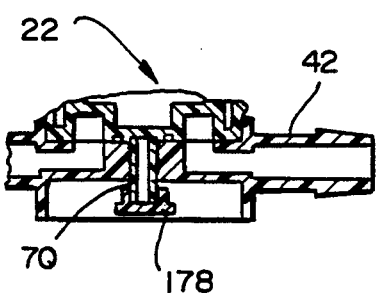
FIGS. 10 and 11 show on reduced scale, respective other forms of keeper devices by means of which the valve cover can be secured to the valve body.
Figure 11:
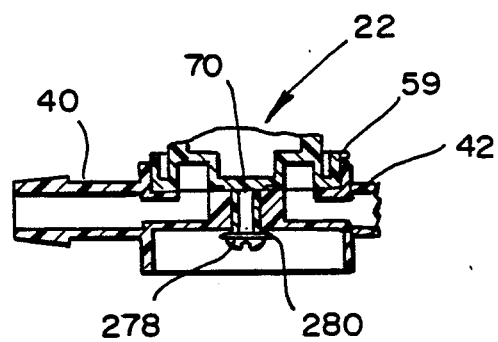

Alternative manners of captively rotatably securing the valve cover to the valve body are shown in FIGS. 10 and 11. FIG. 10 shows use of a snap fit cap 178 inserted on the lower end of pivot 70, the top annular edge of the cap being spaced a distance from the valve body underside so that limited axial movement of the valve cover is assured. FIG. 11 shows use of a screw 278 screwed into the blind bore of the pivot and its widened head as at 280 spaced slightly below the valve body underside.

Rotatable movement of the valve cover 22 can be effected with a finger grip member part of the valve cover which finger grip member 80 is formed as structure upstanding on the valve cover and comprised in one form as parallel spaced walls 82,84 which at opposite ends merge as at 86,88, respectively. A user by rotating the valve cover can align or register the flow groove end terminations with the seat openings to establish communication between the evacuation space and the vacuum producing means, i.e., establish that an unobstructed flow course runs from the evacuation space 12, through hose 18, nipple 40, through opening 30, into flow groove 58, into opening 32, through nipple 42 and hose 19 into the vacuum producing means. To accommodate such positioning with accuracy and speed, a telltale means is provided so that user can visually observe the requisite rotation for producing proper orientation. This telltale is, in the instance where the seat openings and nipples are 180 degrees apart, constituted by the merging portions 84,86 of the grip member walls which merge in the semblance of arrowheads pointing in opposite directions. These arrowheads when pointed toward the nipples 40, 42 indicate the seat openings are registered with the flow groove ends. Also a legend "VACUUM" impressed in the valve cover serves as indicia for correlating arrowhead positioning and purpose. Where the seat openings and nipples are arranged at other than 180 degree circular spacings, an alternate grip member construction can be used and same be marked with arrowheads pointing in the appropriate directions.

Valve cover 22 also has a vent passage 90 extending therethrough from flat surface 26 to an exterior surface, i.e., the top surface 94 of the valve cover. By rotating the valve cover from "VACUUM" connect position as shown in FIG. 2 a distance of 90 degrees either or counterclockwise, the vent passage 90 is registered with an end of the flow groove so that atmospheric air can be bled into the evacuation space or the vacuum producing means whichever the case may be, there being a "BLEED" indicia adjacent vent passage 90 to aid in performing that task.

The arrangement of the seat openings, nipples and blind groove ends at diametrically or substantially 180 degree opposed locations is a particularly advantageous one in that it facilitates the simplicity and surety with which the valve is oriented to connect vacuum service from pump 14 to space 12. The technician notes that the telltale need only be positioned to point with its opposite ends at the hoses 18,19. But as explained earlier, this is not essential requirement since any angular spacing between the seat openings, the nipples etc is acceptable, the only limitation being that the nipples not be so close to each other that it is not possible to mount hoses thereon. Also it is preferable that the ends of groove 58 have angular spacing corresponding with that of the seat openings.

From reading of the foregoing description, it will be appreciated that various modifications can be made in the valve without departing from the scope of the claims. Thus it is seen that the valve cover member 22 of the FIGS. 3, 10 and 11 forms has a somewhat deeper open center body part as at 96, than is the case with the valve cover shown in FIG. 6.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A simply constructed, inexpensively manufactured rotary valve for interconnecting a space to be evacuated and a vacuum producing means, said rotary valve comprising a valve body having a recessed circular outline flat seat and first and second passages therein, the respective passages each having a first passage end termination at one of a circularly spaced pair of seat face openings, an opposite passage end of each respective passage terminating in communicative juncture with one of a pair of tubular nipples extending laterally from the valve body, one nipple being adapted for receiving a tube communicating with said space, the other nipple being adapted for receiving a tube communicating with the vacuum producing means, a valve cover having a circular outline flat face receivable on said valve body with said flat face juxtaposed concentrically with said seat, said valve cover having an elongated curved, blind groove formed in its flat face, said groove having opposite end terminations, an endless elastic seal member, the flat face of said valve cover having a further groove formed therein encircling said blind groove in a course following that of said blind groove, said seal member being received in said further groove and extending downwardly a distance from the valve cover flat face, and means for captively rotatably securing said valve cover to said valve body but with limited freedom of said valve cover to move axially toward and away from said seat, rotatably orienting the valve cover on the valve body to register the ends of its blind groove with the respective ones of the seat openings establishing communication between said space and said vacuum producing means, reduced pressure within said valve when said valve cover is so oriented and said vacuum producing means is operated resulting in ambient atmospheric pressure imposing loading on said valve cover and urging its flat face toward said seat whereby said seal is caused to be tightly urged against said seat to seal the flow course run in the valve against ambient pressure incursion thereto.

2. The rotary valve of claim 1 in which the seat face openings are disposed at diametrically opposed locations, the nipples correspondingly extending from the valve body at like diametrically disposed locations, and the blind groove opposite end terminations being at diametrically opposed locations.

3. The rotary valve of claim 1 in which said valve cover has a vent passage extending from the flat face thereof to an opposite surface thereof, rotatably orienting said valve cover on the valve body to register said vent passage with one of the respective seat openings establishing communication between the ambient atmosphere and the one of the evacuation space and vacuum producing means to which it is connected.

4. The rotary valve of claim 2 in which said valve body has a central axial bore therein, said securing means comprising a pivot pin extending axially of the flat face of said valve cover and received in said central bore, said pivot pin extending a distance below an undersurface of said valve body, and keeper means attached to said pivot pin, said keeper means being spaced a distance from said valve body undersurface sufficient to permit said pivot pin to move axially toward and away from said undersurface.

5. The rotary valve of claim 4 in which the pivot pin has an encircling groove therein, said keeper means comprising a ring received in said groove.

6. The rotary valve of claim 5 in which said keeper ring is an O-ring of elastic material.

7. The rotary valve of claim 4 in which said keeper means comprises a cap received on the pivot pin a distance below the valve body undersurface.

8. The rotary valve of claim 4 in which said pivot pin has a blind bore therein, said keeper means comprising a screw thread received in said pivot blind bore.

9. The rotary valve of claim 1 further comprising readily visibly observed telltale means carried on said valve cover denotive of the rotatable orientation positioning thereof in which communication is established between the evacuation space and the vacuum producing means.

10. The rotary valve of claim 9 in which the telltale means includes structure defining oppositely pointing arrowheads.

11. The rotary valve of claim 10 in which the telltale structure comprises an upstanding finger manipulated grip a user grasps to rotate said valve cover, the grip including a pair of upstanding parallel spaced walls, opposite end portions of the walls merging toward each other to define at each end of the grip an arrowhead.

12. The rotary valve of claim 3 further comprising indicia means carried on the opposite surface of said valve cover adjacent said vent passage and being denotive of the rotatable orientation positioning of said valve cover on said seat to establish register of said vent passage with one of the respective two passages in said valve body.

13. The rotary valve of claim 1 further comprising seal member holding means carried in said further groove for holding said seal member securely therein.

14. The rotary valve of claim 13 in which said holding means comprises seal member engagable projections extending laterally a distance into said further groove.

15. The rotary valve of claim 1 in which said valve body and said valve cover are molded plastic members.

16. The rotary valve of claim 15 in which the plastic is polypropylene.

* * * * *